US012399916B2

(12) United States Patent
Österberg et al.

(10) Patent No.: US 12,399,916 B2
(45) Date of Patent: Aug. 26, 2025

(54) METHOD, SYSTEM AND COMPUTER PROGRAM PRODUCT FOR GENERATING LABELLED 3D DATA REPRESENTATIONS OF REAL WORLD OBJECTS

(71) Applicant: DEEP FORESTRY AB, Uppsala (SE)

(72) Inventors: Erik Österberg, Uppsala (SE); William Johnsson, Uppsala (SE); Levi Farrand, Uppsala (SE)

(73) Assignee: DEEP FORESTRY AB, Uppsala (SE)

( * ) Notice: Subject to any disclaimer, the term of this patent is extended or adjusted under 35 U.S.C. 154(b) by 65 days.

(21) Appl. No.: 17/911,993

(22) PCT Filed: Mar. 1, 2021

(86) PCT No.: PCT/EP2021/055054
§ 371 (c)(1),
(2) Date: Sep. 15, 2022

(87) PCT Pub. No.: WO2021/185561
PCT Pub. Date: Sep. 23, 2021

(65) Prior Publication Data
US 2023/0123749 A1   Apr. 20, 2023

(30) Foreign Application Priority Data
Mar. 20, 2020  (SE) .................................. 2050307-4

(51) Int. Cl.
*G06F 16/29*   (2019.01)
*G06T 7/73*    (2017.01)
(Continued)

(52) U.S. Cl.
CPC ............... *G06F 16/29* (2019.01); *G06T 7/73* (2017.01); *G06T 17/10* (2013.01); *G06V 20/64* (2022.01);
(Continued)

(58) Field of Classification Search
CPC . G06T 7/73; G06T 17/10; G06T 2207/10028; G06T 2207/30204
See application file for complete search history.

(56) References Cited

U.S. PATENT DOCUMENTS 10,169,680 B1  1/2019  Sachdeva et al.
10,417,781 B1  9/2019  Konolige et al.
(Continued)

FOREIGN PATENT DOCUMENTS

CN     110858415 A    3/2020

OTHER PUBLICATIONS

Wang et al., "Latte: Accelerating LiDAR Point Cloud Annotation via Sensor Fusion, One-Click Annotation, and Tracking", IEEE Intelligent Transportation Systems Conference (ITSC), 2019, pp. 265-272.
(Continued)

*Primary Examiner* — Grace Q Li
(74) *Attorney, Agent, or Firm* — James S. Keddie; Bozicevic, Field & Francis LLP

(57) ABSTRACT

There is provided a method for generating labelled 3D data representations of real-world objects, comprising: —obtaining, using processing circuitry (110), a set of one or more pre-labelled 3D coordinate, each 3D coordinate in the set of one or more pre-labelled 3D coordinate representing a point on a real world object in a real world area, —for each of the one or more pre-labelled 3D coordinates in the obtained set: —obtaining a template volume to be applied to the 3D coordinate using the processing circuitry (110); —generating an object volume comprising the 3D coordinate, using the processing circuitry (110), by applying the obtained template volume to the 3D coordinate; and—labelling the generated object volume, by assigning the object label of the pre-labelled 3D coordinate to all 3D coordinates located
(Continued)

within the generated object volume. Also provided are a system and computer program product.

28 Claims, 5 Drawing Sheets

(51) Int. Cl.
 *G06T 17/10* (2006.01)
 *G06V 20/64* (2022.01)
(52) U.S. Cl.
 CPC ............... *G06T 2207/10028* (2013.01); *G06T 2207/30204* (2013.01)

(56) References Cited

U.S. PATENT DOCUMENTS

| | | | |
|---|---|---|---|
| 2017/0116781 A1* | 4/2017 | Babahajiani | G06T 15/506 |
| 2017/0243352 A1 | 8/2017 | Kutliroff et al. | |
| 2017/0337742 A1* | 11/2017 | Powderly | G06F 3/0482 |
| 2018/0075666 A1 | 3/2018 | Feng et al. | |
| 2018/0373980 A1 | 12/2018 | Huval | |
| 2019/0180150 A1 | 6/2019 | Taylor et al. | |
| 2019/0197778 A1 | 6/2019 | Sachdeva et al. | |
| 2019/0258876 A1 | 8/2019 | Liu et al. | |
| 2019/0317974 A1 | 10/2019 | Chamberlin et al. | |
| 2019/0370606 A1 | 12/2019 | Kehl et al. | |
| 2020/0066034 A1 | 2/2020 | Tham et al. | |
| 2021/0192689 A1* | 6/2021 | Bosse | G06F 18/2135 |
| 2023/0008567 A1* | 1/2023 | Zikos | G06T 17/00 |

OTHER PUBLICATIONS

Windrim et al., "Forest Tree Detection and Segmentation using High Resolution Airborne LiDAR", IEEE/RSJ International Conference on Intelligent Robots and Systems (IROS), 2019, pp. 3898-3904.

\* cited by examiner

METHOD, SYSTEM AND COMPUTER PROGRAM PRODUCT FOR GENERATING LABELLED 3D DATA REPRESENTATIONS OF REAL WORLD OBJECTS

CROSS-REFERENCE TO RELATED APPLICATIONS

This application is a § 371 national phase of International Application No. PCT/EP2021/055054, filed on Mar. 1, 2021, which claims the benefit of Swedish Application No. 2050307-4, filed on Mar. 20, 2020, which applications are incorporated by reference herein.

TECHNICAL FIELD

The present invention relates to a method, system and computer program product for generating labelled 3D data representations of real world objects.

BACKGROUND

In order to enable an artificial intelligence (AI) algorithm to recognize real world objects based on two dimensional (2D) image representations of the real world objects and their surroundings, the artificial intelligence (AI) algorithm first needs to be trained using labelled 2D images comprising labelled objects of the intended type. For the training to be successful and lead to high precision in the coming recognition by the AI algorithm, a very large amount of labelled training data (e.g. labelled 2D images) is required for the training phase.

To obtain labelled training data, manual image recognition is typically performed by a person looking at 2D images and labelling objects in the images, so that an AI algorithm later analysing the same 2D images can learn to recognise the labelled object types. Obviously, this is very expensive due to the huge amount of time required for the manual labelling work to be performed.

One improvement that has been made within the field of generating labelled data is to segment labelled 3D images or objects, present in a virtual 3D representation of a real world scene, into 2D images. Within the 3D scene, the viewpoint and viewing angle of virtual cameras may be changed so that one single labelled 3D object can be depicted from many angles and hence many 2D training images can be obtained, significantly increasing what can be learned by the AI algorithm from each labelled object. However, since the 3D images and objects need to be manually labelled before the segmentation into 2D training images can be performed, the problem of the time consuming and costly labelling process remains.

This problem also remains in cases where AI is not being trained exclusively in the 2D domain. Some AI is trained in the 3D domain. The problem here is the same, this process requires large amounts of labelled 3D data for the AI training to be satisfactorily conducted in the 3D domain. Gathering this 3D labelled data is slow, laborious, and expensive.

SUMMARY

The object of the present invention is to eliminate or at least to minimize the problems discussed above. This is achieved by a computerized method for generating labelled three dimensional (3D) data representations of real world objects, systems for performing the method and software according to the appended independent claims.

The labelled 3D data representing the real world area is obtained without any need for manual labelling of the 3D objects in the 3D virtual scene. Method, system and computer program product embodiments presented herein thereby provide a fast, in-expensive and in many applications personalized way to gather labelled 3D data representations of real world objects in a real world area.

The method for generating labelled 3D data representations of real world objects comprises
  obtaining, using processing circuitry, a set of one or more pre-labelled 3D coordinate, each 3D coordinate in the set of one or more pre-labelled 3D coordinate representing a point on a real world object in a real world area,
  wherein each 3D coordinate in the set of one or more pre-labelled 3D coordinate is defined in a 3D local coordinate system of the real world area,
  wherein each 3D coordinate in the set of one or more pre-labelled 3D coordinate is associated with a respective object label representing a pre-defined object type;
    for each of the one or more pre-labelled 3D coordinates in the obtained set:
      obtaining a template volume to be applied to the 3D coordinate using the processing circuitry;
      generating an object volume comprising the 3D coordinate, using the processing circuitry, by applying the obtained template volume to the 3D coordinate; and
  labelling the generated object volume, using the processing circuitry, by assigning the object label of the pre-labelled 3D coordinate to all 3D coordinates located within the generated object volume. The main advantage of embodiments presented herein is that labelled 3D data points can be acquired automatically, based on embodiments presented herein, based on information about a limited number of pre-labelled real world objects.

Furthermore, the pre-labelled 3D data is acquired without requiring any further human interaction necessary after the 3D data has been collected. Specifically, the need for a human user labelling objects in captured 2D or 3D images, or in a subsequently generated virtual environment representing the real world area, is removed or at least greatly reduced by embodiments presented herein.

It is highly advantageous that a large number of 2D images can be achieved and used as training data for an AI, as explained further below. It is equally advantageous to use 3D images, 3D objects, 3D point clouds or other suitable 3D representations as training data for an AI, especially since the method and system according to the present invention provides a more time efficient and cost efficient way of labelling zo data than available prior art methods and systems. In other words, training data obtained by embodiments herein, in the form of 2D or 3D data, already comprises labelled training data. Especially compared to prior art methods and systems where a human expert labels objects in 2D or 3D images, or other suitable 3D representations, the inventive method and system now allows for the expert to label objects in a real world area where the human eye is better at distinguishing between similar objects than when the same expert looks at virtual representations of the real world area or objects from the real world area, in the form of captured virtual images or the like. This results in a more accurate labelling that significantly decreases errors in training data. This is especially useful when the differences between label classes (e.g. different species of trees, bushes or the like in the case of forest environments) are only slight and therefore cannot be easily differentiated in the virtual environment, neither by the human eye, nor by image processing.

Suitably, a person who wants to identify objects of a certain object type may further use the thus generated labelled 3D data representations, i.e. labelled virtual world representations of the real world objects, to generate a large amount of training data for an artificial intelligence (AI) algorithm. The generation of training data may be performed by capturing 2D images of the 3D data representations from different viewpoints using one or more virtual camera. Or in the case of photogrammetry by tracing thus labelled 3D representations back into the 2D pixels that were initially used to build an original, unlabelled, point cloud. Since the 3D data representations are labelled, a large number of images may thus be obtained based on each labelled object.

Suitably, obtaining a template volume to the pre-labelled 3D coordinate comprises obtaining a pre-determined template volume associated with the object type of the pre-labelled 3D coordinate. The pre-determined template volume associated with the object type of the pre-labelled 3D coordinate may have a pre-determined shape representative of a generic object of the object type.

Thereby, a predetermined volume for each object type can be used as a template volume so that objects marked with a given label is associated with a volume that corresponds to a typical volume for a generic object of that object type. This saves time and capacity since an object only needs to be classified as belonging to an zo object type without also having to be assessed for a total volume that should be associated with that specific object and also not with a shape within which that volume should be contained. For oblong objects such as trees or round objects such as mushrooms this means that labelling them as belonging to a given object type also allows for using a template volume that has information of a total volume that such objects should be associated with as well as their orientation and shape.

Suitably, applying the obtained template volume to the prelabelled 3D coordinate further comprises scaling the template volume in relation to a determined size of the object. Thereby, it can be compensated for objects that differ in size from what can be expected of an object belonging to an object type, so that the template volume is usable also for objects that are smaller or larger than other similar objects.

The method may further comprise receiving, in the processing circuitry, sensor data from at least one sensor located on an un-manned vehicle moving through the real world area, wherein the set of one or more pre-labelled 3D coordinate is obtained based on sensor data received from at least one of said sensors. Thereby, the one or more pre-labelled 3D coordinate may be detected in an efficient way without requiring a human operator moving through the real world area.

Suitably, the method may comprise generating, using the processing circuitry, a point cloud, 3D map or other 3D representation comprising the labelled object volumes. Also, the method may comprise updating, using the processing circuitry (110), a point cloud, 3D map or other 3D representation to include the labelled object volumes.

Thereby, a representation of the labelled object volumes can be created, or a pre-existing representation can be updated, so that the labelled object volumes can be represented in an accurate way related to each other and to a representation of the real world area for later access and analysis.

Suitably, the method also comprises generating, using the processing circuitry, training data for an artificial intelligence network based on the point cloud, 3D map or other 3D representation, by generating 2D images of one or more of the labelled object volumes within said point cloud, 3D map or other 3D representation from different viewpoints using at least one virtual camera. Alternatively, or in combination, the method may comprise generating, using the processing circuitry, training data for an AI network in the form of 3D images or 3D objects or 3D volumes based on the point cloud, 3D map or other 3D representation. Alternatively, or in combination, the method may comprise generating, using the processing circuitry, training data for an AI network in the form of at least a part of the 3D point cloud, 3D map or other 3D representation, e.g. as a 3D volume obtained by embodiments herein. Thereby, large amounts of training data can be generated in an efficient way so that significant advantages both in time and processing capacity can be achieved compared to prior art methods for generating training data for artificial intelligence networks. By generating training data through 2D images taken by a virtual camera, the same point cloud, 3D map or other 3D representation can be used to create large amounts of 2D and/or 3D training data that would otherwise be both time consuming and cumbersome to generate. This allows for a cost efficient training of artificial intelligence networks so that they may be used for applications where it has previously been too expensive and time consuming to use artificial intelligence networks at all.

Suitably, each object label is derived based on a physical marker associated with a physical location on the real world object. Thereby, physical markers can be used by a human operator to place on the real world object and identify it without requiring the use of digital tools during marking. This is convenient since a large number of physical markers of cost efficient kinds such as tags or paint may be used without needing to also be synchronized with digital means during marking.

Each object label may alternatively be derived based on a digital marker associated with a digital position defined in the local coordinate system. Thereby, digital markers can be added to a digital tool used during marking, thus eliminating the need for placing physical markers as well. This is potentially also an efficient solution since no physical markers are needed so that the human operator will be able to mark a large number of real world objects without requiring any tools apart from a user device for determining a digital position for each marker set.

Suitably, obtaining the set of one or more pre-labelled 3D coordinate comprises receiving one or more pre-labelled 3D coordinate each representing a point on a real world object from a user device localized within the 3D local coordinate system. Thereby, data collected by a user device can be used directly as input for the method in a time and cost efficient way.

The present invention also comprises a system for generating labelled 3D data representations of real world objects, comprising processing circuitry configured to
   obtain a set of one or more pre-labelled 3D coordinate, each 3D coordinate in the set of one or more pre-labelled 3D coordinate representing a point on a real world object in a real world area,
   wherein each 3D coordinate in the set of one or more pre-labelled 3D coordinate is defined in a three-dimensional, 3D, local coordinate system,
   wherein each 3D coordinate in the set of one or more pre-labelled 3D coordinate is associated with a respective object label representing a pre-defined object type;

the processing circuitry further being configured to, for each of the one or more pre-labelled 3D coordinates in the obtained set:
- obtain a template volume to be applied to the 3D coordinate;
- generate an object volume comprising the 3D coordinate by applying the obtained template volume to the 3D coordinate; and
- label the generated object volume by assigning the object label of the pre-labelled 3D coordinate to all 3D coordinates located within the generated object volume.

Suitably, the processing circuitry is configured to associate the template volume with the 3D coordinate by obtaining a pre-determined template volume associated with the object type of the 3D coordinate. Thereby, typical volumes and shapes for a given object type can be associated with the 3D coordinate to avoid the need for additional information to be given by the 3D coordinate apart from the object label.

Also, the processing circuitry may further be configured to scale the template volume in relation to a determined size of the object when applying the template volume to the pre-labelled 3D coordinate. Thereby, the same template volume may be used for objects that differ in size from what is deemed typical for objects of a particular object type. This reduces the need for large numbers of object types that differ from each other mainly in size, so that fewer object types can be used to label all desired objects within a real world area.

Suitably, the processing circuitry is further configured to:
- receive sensor data from at least one sensor located on an un-manned vehicle moving through the real world area; and
- obtain the set of one or more pre-labelled 3D coordinate based on sensor data received from at least one of said sensors.

Thereby, an un-manned vehicle can be used after a human operator has labelled objects within a real world area to efficiently detect all pre-labelled 3D coordinates there.

The processing circuitry may further be configured to generate a point cloud, 3D map or other 3D representation comprising the labelled object volumes, or alternatively to update a point cloud, 3D map or other 3D representation to include the labelled object volumes. Thereby, the coordinates for the labelled object volumes can be represented in relation to a representation of the real world area in which they have been detected.

Suitably, the processing circuitry is further configured to generate training data for an artificial intelligence network using the point cloud, 3D map or other 3D representation, by generating 2D images of one or more of the labelled object volumes within said point cloud, 3D map or other 3D representation from different viewpoints using at least one virtual camera, or alternatively aligning labelled points/3D coordinates back to their original pre-captured images. Alternatively, or in combination, the processing circuitry may be configured to generate training data for an artificial intelligence network using the point cloud, 3D map or other 3D representation, by generating 3D images of one or more of the labelled object volumes within said point cloud, 3D map or other 3D representation from different viewpoints using the at least one virtual camera. Alternatively, or in combination, the processing circuitry may be configured to generate training data for an artificial intelligence network in the form of at least a part of the point cloud, 3D map or other 3D representation. Thereby, large amounts of training data can be generated in an efficient way so that significant advantages both in time and processing capacity can be achieved compared to prior art methods for generating training data for artificial intelligence networks. By generating training data through 2D images taken by a virtual camera, and/or 3D images, the same point cloud, 3D map or other 3D representation can be used to create large amounts of training data that would otherwise be both time consuming and cumbersome to generate. This allows for a cost efficient training of artificial intelligence networks so that they may be used for applications where it has previously been too expensive and time consuming to use artificial intelligence networks at all.

Each object label may be derived based on a physical marker associated with a physical location on the real world object. Alternatively, each object label may be derived based on a digital marker associated with a digital position defined in the local coordinate system. This is associated with the advantages mentioned above with reference to the method.

Suitably, the processing circuitry is further configured to obtain the set of one or more pre-labelled 3D coordinate by receiving one or more pre-labelled 3D coordinate each representing a point on a real world object from a user device localized within the 3D local coordinate system. Thereby, the user device can be used not only to label objects within a real world area but also to transmit or upload pre-labelled 3D coordinates so that further detection of the pre-labelled 3D coordinates within the real world area can be avoided.

The present invention further comprises a handheld user device for generating labelled 3D data representations of real-world objects is shown. The handheld user device is configured to be localized in a three-dimensional, 3D, local coordinate system. The handheld user device comprises processing circuitry configured to generate a set of one or more pre-labelled 3D coordinate, each 3D coordinate in the set of one or more pre-labelled 3D coordinate representing a point on a real world object in a real world area, wherein each 3D coordinate in the set of one or more pre-labelled 3D coordinate is defined in the three-dimensional, 3D, local coordinate system. Each 3D coordinate in the set of one or more pre-labelled 3D coordinate is also associated with a respective object label representing a pre-defined object type. The processing circuitry is further configured to, for each of the one or more pre-labelled 3D coordinates in the obtained set, obtain or generate a template volume to be applied to the 3D coordinate and generate an object volume comprising the 3D coordinate by applying the obtained template volume to the 3D coordinate. The obtaining of a template volume to be applied to the 3D coordinate and generating an object volume comprising the 3D coordinate by applying the obtained template volume to the 3D coordinate may be performed in any manner described herein.

The processing circuitry of the handheld user device may further be configured to label the generated object volume by assigning the object label of the pre-labelled 3D coordinate to all 3D coordinates located within the generated object volume, in any manner described herein. Alternatively, the processing circuitry of the handheld user device may be communicatively connected to the system and configured to send the generated object volume and any relevant associated data to the processing circuitry of the system, wherein the processing circuitry of the system is configured to receive the generated object volume and label the generated object volume by assigning the object label of the pre-labelled 3D coordinate to all 3D coordinates located within the generated object volume.

Thereby, labelled 3D data representations of real world objects, represented in a 3D scene/map/point cloud or other similar context, are obtained without any manual processing of the captured sensor data/images. The labelled 3D data can then be used for producing any number of 2D and/or 3D training images or other forms of AI training data, in manners known in the art. Embodiments of the handheld user device is further associated with the advantages given above with reference to the method and to the system.

The present invention further comprises a non-transitory computer-readable storage medium storing instructions which, when executed by processing circuitry of a system, cause the system to:

obtain a set of one or more pre-labelled 3D coordinate, each 3D coordinate in the set of one or more pre-labelled 3D coordinate representing a point on a real world object in a real world area, wherein each 3D coordinate in the set of one or more pre-labelled 3D coordinate is defined in a three-dimensional, 3D, local coordinate system, wherein each 3D coordinate in the set of one or more pre-labelled 3D coordinate is associated with a respective object label representing a pre-defined object type; and for each of the one or more pre-labelled 3D coordinates in the obtained set:

obtain a template volume to be applied to the 3D coordinate;

generate an object volume comprising the 3D coordinate by applying the obtained template volume to the 3D coordinate; and label the generated object volume by assigning the object label of the pre-labelled 3D coordinate to all 3D coordinates located within the generated object volume.

This is associated with the advantages given above with reference to the method and to the system.

Suitably, the non-transitory computer-readable storage medium further stores instruction which, when executed by processing circuitry of a system (100) for generating labelled 3D data representations of real-world objects, cause the system to perform the method steps according to the present invention.

The thus generated training data may further advantageously be used for training one or more AI algorithms to recognize any or all of the labelled object types.

The effects and/or advantages presented in the present disclosure for embodiments of the method according to the first aspect may also apply to corresponding embodiments of the system and non-transitory computer-readable storage medium.

Many additional benefits and advantages of the present invention will be readily understood by the skilled person in view of the detailed description below.

It is noted that embodiments of the present disclosure relate to all possible combinations of features recited in the claims.

DRAWINGS

The invention will now be described in more detail with reference to the appended drawings, wherein FIG. 1 is a schematic overview of a system for generating labelled 3D data representations of real-world objects, according to one or more embodiments;

Figure 6:
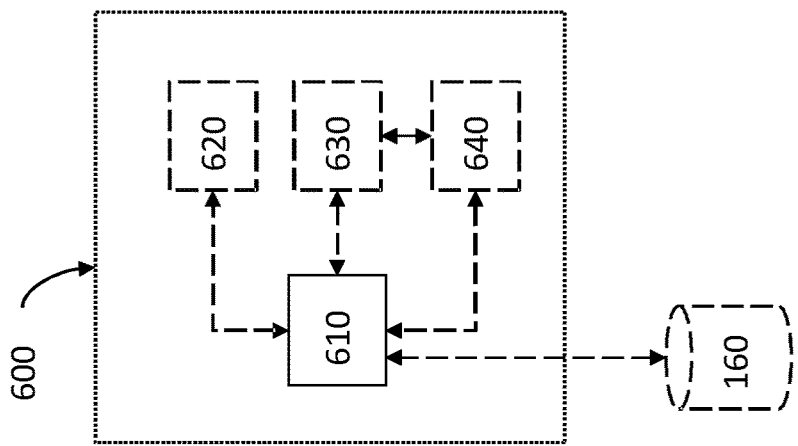
FIG. 6 is a schematic overview of a handheld user device for generating labelled 3D data representations of real-world objects, according to one or more embodiments.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Aspects of the present disclosure will be described more fully hereinafter with reference to the accompanying drawings. The methods and systems disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Embodiments presented herein may be used for generating labelled 3D data representations of real world objects in any real world environment, and there are numerous applications that can benefit from the solutions presented herein. However, the inventors envisage that the greatest advantages of the herein presented embodiments will be obtained if the labelling is performed for 3D representations of real world objects in real world areas where no previous labelling, or only inferior quality labelling, is previously available. A number of non-limiting examples of such suitable applications is presented herein.

Besides the fact that the labelling takes so much time, attempting to perform manual labelling of 3D objects in a virtual 3D representation would further most likely not provide accurate labelling results. The reason is that the human eye is not as well adapted to detect objects and details in a virtual 3D representation as compared to detecting the same objects in the real world, due to low resolution of the 3D images/representations and also to artifacts that may occur in the image data. As a consequence, training data obtained from manually labelled 3D objects (the labelled 3D objects in this context of course being virtual or digital 3D representations of objects) would be less precise and accurate than desired.

The problem also remains in domains that need labelled 3D data for use-cases other than AI. The forestry industry is a good example of this. Forestry companies often use 3D data to determine the most cost-effective routes to harvest commercial forests. However, this 3D data does not yet include site-specific object labels. This is because it is too difficult and time consuming for the forestry fieldworker to transfer their real world observations into the virtual 3D environment using a computerized geoinformatics interface.

The method, system and computer program product embodiments disclosed herein can be used in any environment and can be adapted to a specific purpose by the pre-labelled 3D coordinates identifying points in the real world area representing a desired selection of object types, and any other input data provided into the method, system and computer program product. Thereby, the disclosed solution can be highly personalized and adapted to contribute to any suitable purpose that requires objects to be efficiently recognized.

For ease of understanding, a number of non-limiting purposes or applications where the present invention is highly useful are first described in the section Use case examples. Thereafter, the system architecture, method embodiments and further embodiments enabling the invention are described in more detail.

USE CASE EXAMPLES

In the following, a number of examples will be presented where the invention is put into practice in different applications. As mentioned above, these examples are not to be seen as limiting but aim simply to demonstrate how the invention can be employed to achieve the advantages described herein. In the examples, the invention is used within the field of forestry, but it is especially to be noted that the invention is suitable for use within any technical field where it is desirable to generate labelled 3D data representations of real world objects. Such fields include but are not limited to the field of biology and population ecology where the invention can be used to locate objects of a specific species within a large area, or the field of geology where a particular type of mineral may be detected in mining applications based on the invention. Other fields may be mine safety where safety sites such as fire escapes, the location of light fittings, special cable junctions and emergency exit routes can be located and marked. Within the field of agriculture crops can be classified using the invention (for instance by marking apples as healthy or diseased), and in a factory or warehouse the invention can be used to recognize items such as defective products or out of place items. Another suitable field is recycling where rubbish may be recognized and sorted using the invention. The invention can also be used in the field of marine biology to label, count and detect different species of coral or underwater organisms using a submersible robot and 3D mapping sensor. Other suitable fields of application may be within animal husbandry, especially in enclosed stables or warehouses; in big industry facilities, oil rigs, refineries, power plants, transmission lines etc. where there is a need of for example counting, monitoring the number of and/or identifying or distinguishing between different objects or species. Of course, embodiments presented herein may advantageously also be used in any other suitable application where obtaining labelled 3D data is currently a challenge.

For each of the examples below, the real world area is exemplified as a forest area containing objects such as trees, bushes, flowers and mushrooms, and also potentially containing objects or areas that require specific consideration when mapping the forest area or when passing through the forest area with vehicles such as harvesters. Such objects or areas may be areas where driving a vehicle is difficult (e.g. swamps, lakes, areas with rocks or boulders, dead wood on the forest floor with environmental value, or hills and mountains where an inclination of the ground makes the area impassable or difficult to navigate), or may alternatively be areas and objects that require special consideration such as heritage sites or places where endangered or protected species of animals or plants can be found.

Figure 3:
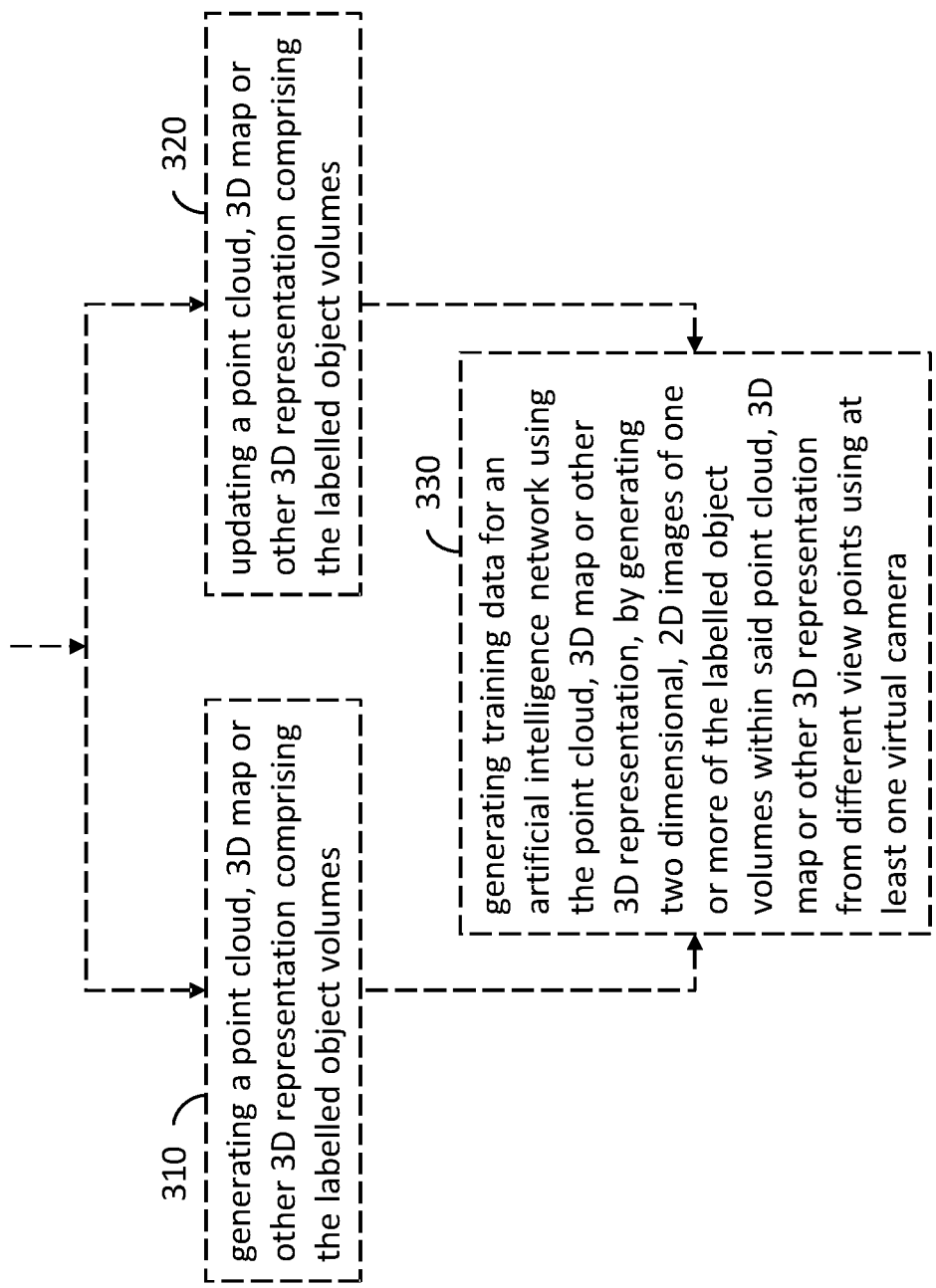
FIG. 3 is a flow chart of further method embodiments for generating labelled 3D data representations of real-world objects.
Figure 4:
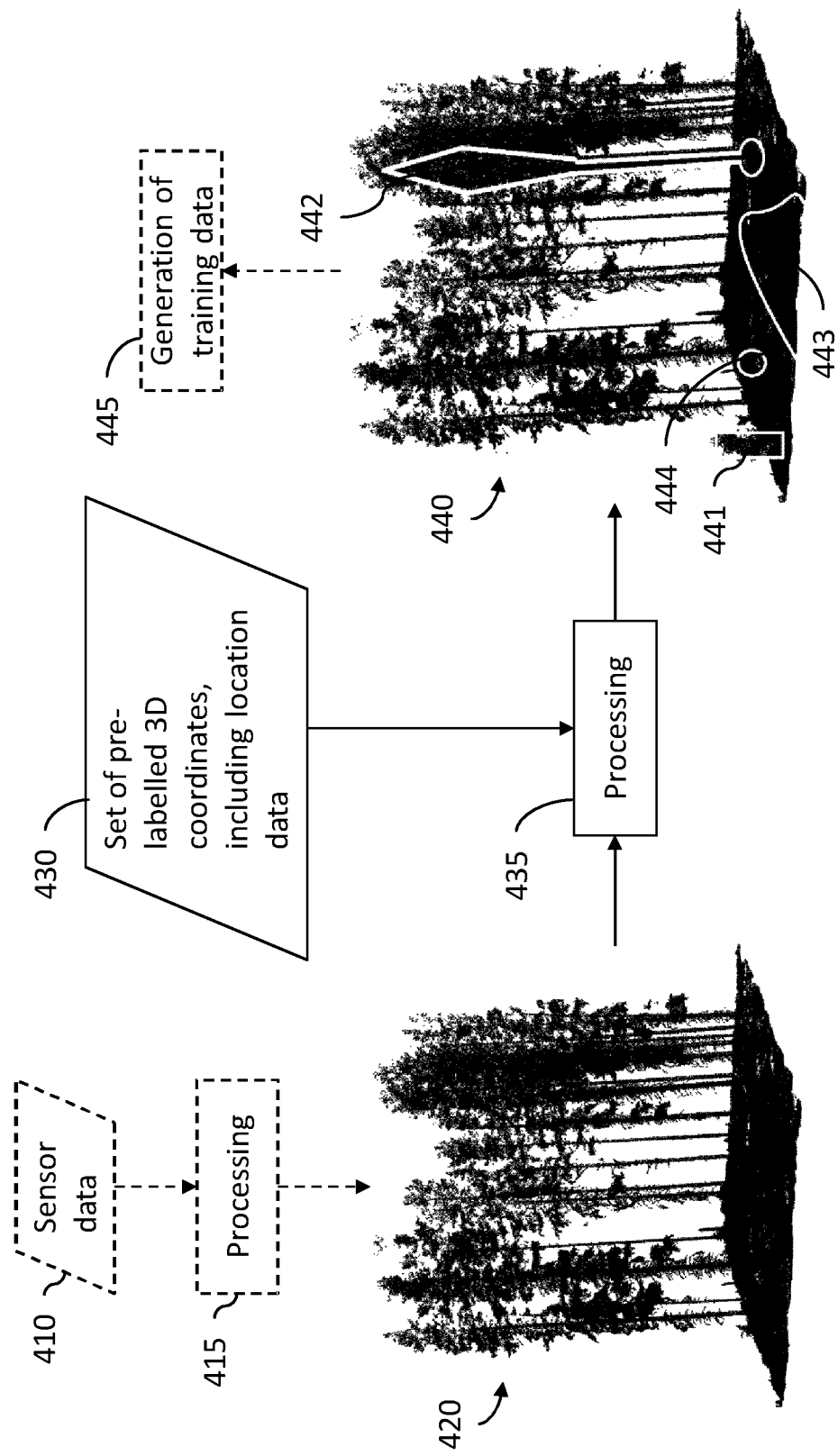
FIG. 4 shows an illustrative example of data processing according to embodiments presented herein.

In the examples, we also refer to FIG. 4, which shows an illustrative example of input data and processing of data according to embodiments described herein, within the non-limiting context of forestry. In FIG. 4, embodiments of the invention are mainly performed in the processing step 435. In some embodiments, previous and/or subsequent steps or actions, for example in line with step 415 and/or 445, may also be performed within the scope of the claimed invention. Different system and method embodiments are further described in connection with FIGS. 1 to 3.

Example 1

In this example, the invention is used to create labelled 3D data that represent a forest area and objects that can be found in that forest area. Before the invention is used, pre-labelled 3D data are first generated by a human operator such as a fieldworker who is an expert within the field of forestry and forest management and therefore able to identify different types of objects in a forest area.

In order to generate the pre-labelled 3D data, the fieldworker is equipped with some way of marking objects in the forest. This may include physical markers such as RFID tags that can be attached to objects or visual physical markers such as QR codes that are also attached. Alternatively, the fieldworker uses a virtual marking device such as a handheld GPS (global positioning system) RTK (real time kinematic) node that places a virtual marker.

In order to establish a local positioning system, a global positioning system such as GPS, GLONASS (GLObal NAvigation Satellite System), Galileo, or the like may be used, and the virtual marking device may associate coordinates in relation to that system during marking of objects. In some examples, an RTK base station may be used in combination with a global positioning system to provide more precise location data, and the virtual marking device may in these embodiments associate coordinates in relation to the more precise location data during marking of objects.

Overall, markers are placed into a real world environment by the fieldworker and are assigned associated meta-data regarding a class type that they represent and the volume of space in the virtual environment that that class type should occupy. A volume may in this context be a continuous volume, or a volume built up by a continuous group of discrete points/3D coordinates in a point cloud or other virtual 3D representation.

The marking itself takes place by the fieldworker moving through the forest and identifying objects that are to be marked, followed by applying a marker physically to the object by sticking a tag or applying paint or similar to the object. Alternatively, the objects are marked digitally by the fieldworker marking an object with a digital device, for example a user device 150 as described in connection with FIG. 1, or alternatively the physical and virtual markers may be used simultaneously. For a virtual marker, a digital device may have a virtual representation of the real world area such that a virtual marker is placed by associating a location where an object is in the real world with a coordinate for that location in a representation held by the digital device. Alternatively, the digital device may simply create a coordinate in relation to a local coordinate system or to a GPS system or similar and associate that coordinate with an object type that is selected by the fieldworker.

Thus, when using physical markers, the fieldworker moves through the forest and marks objects by applying stickers, tags or QR codes to the objects themselves. When using virtual or digital markers, the fieldworker also moves through the forest but instead creates digital or virtual markers on a digital device by applying tags to a location where the object is in the real world. This may be done via a handheld RTK node, or other suitable digital device, that the fieldworker places adjacent to each object in order to apply the virtual marker. That location may then correspond to a location in a digital representation of the forest area or may alternatively correspond to coordinates in a local or global positioning system that the digital device has access to. The field worker could use AR glasses or other AR, VR or MR device to view the digital markers as augmented placeholders in the AR world, this would help them assign the correct volume and ensure that individual objects are not marked twice.

The objects may be trees of a particular species, trees that are damaged and not suitable for harvesting, trees that have specific properties that make them suitable for harvesting, or trees of a specific size or within a given size interval. Alternatively, the objects may be bushes, flowers or other plants of a particular species or may be plants that belong to certain categories such as endangered species or species that are desired for harvesting or removal, or alternatively for preservation. The bushes, flowers or plants may also be marked because of their size or other properties that make them interesting in view of predetermined criteria selected for the marking. The objects could also be areas that are of particular interest or that require specific consideration such as heritage sites, swamps, lakes and streams.

When the fieldworker applies markers to the real world objects an object label is also selected for each object. The object label represents a pre-defined object type that may be simply "tree", "bush" or "boulder" but may alternatively be a specific object belonging to a larger category such as a species of tree or bush. When an object is marked, the object label is applied and also associated with a 3D coordinate for a location where the object is situated. The 3D coordinate may be a coordinate in a local coordinate system that includes the real world area, but it may alternatively be a global coordinate system such as the GPS system.

In some situations, multiple markers may be used on a single object so that they not only denote which object type the object belongs to but also includes properties such as size and volume of the object, as will be shown further below.

Thus, the fieldworker places markers on objects within the real world area and selects the markers so that they include the labels that are suitable for the objects marked. The objects are assigned associated meta-data regarding a class type that they represent and also a volume of space in the virtual environment that that class type should occupy. This metadata can be placed into a system via the hand-held device by using input means such as a screen, a GUI, or other suitable input means. The hand-held device may also be a mobile phone.

In some applications, the metadata, also referred to herein as additional data, could be pre-assigned for each type of marker and also be shown by visual means so that the fieldworker is able to distinguish between different types of markers. For instance, green markers could be associated with a particular species of tree and also a particular volume metadata that is typical for that species. Blue markers could be associated with another species of tree and another volume that is typical for that species, whereas red markers could be associated with mushrooms and a volume that is typical for such mushrooms. While moving through the real world area, the fieldworker would mark an object by selecting the marker intended for association with that kind of object. Also, markers could be associated with each other so that a number of markers are virtually joined and intended to be placed on different parts of the same object so that the object volume can be applied to a volume between the markers or, between the markers and also including additional volume around each marker.

In some applications, the metadata is already and possibly permanently associated with the markers, but in other applications the metadata may be selected or changed on site.

After the fieldworker has marked a desired number of objects within the real world area, the inventive method and system is used as follows:

A system comprising processing circuitry is used to generate labelled 3D data representations of the real objects by obtaining a set of pre-labelled 3D coordinates that each represent a point on a real world object in a real world area. Referring to FIG. 4, examples of labelled 3D data representations of the real objects, represented as volumes in a point cloud 440 or other suitable 3D representation, are indicated by the outlines 441, 442, 443 and 444.

The set of pre-labelled 3D coordinates comprises the 3D coordinates associated with the markers that the fieldworker has placed in the forest and they can be obtained by the 3D coordinates placed by the digital markers in relation to the local positioning system or the global positioning system being obtained from a file or plurality of files containing the digital markers or by a point cloud containing the digital markers being obtained, either from the virtual marking device or from another device that the virtual marking device communicates with. Alternatively, the 3D coordinates of each physical marker may be stored digitally in a device available to the fieldworker or in a remote device that the physical markers communicate with. In FIG. 4, the set of prelabelled 3D coordinates correspond to reference number 430, which is input into the processing step 435. The processing in step 435 may be performed according to any of the embodiments described in connection with FIG. 2, and optionally including any of the steps 310 or 320 of FIG. 3.

In one embodiment, the pre-labelled 3D coordinates in the set of pre-labelled 3D coordinates may be obtained by using an un-manned vehicle such as a drone that flies or drives through the forest and detects the markers using at least one sensor and that stores the 3D coordinates in processing circuitry available to the un-manned vehicle, either in the un-manned vehicle itself or in a remote device that the un-manned vehicle communicates with while it is in the forest or after it has left the forest. In FIG. 4, the thus gathered sensor data is referred to using reference number 410. The sensor data 410 may optionally be processed in processing step 415 to obtain an unlabelled 3D representation 420, for example in the form of a point cloud, of the real world area. As shown by the dashed lines in FIG. 4, gathering of sensor data is optional. In other embodiments, such data may be pre-generated, stored and retrieved before or as a part of the processing step 415. In yet other embodiments, the unlabelled 3D representation 420 may be pre-generated, stored and retrieved before or as a part of the processing step 435.

The system may be the un-manned vehicle mentioned above, but it may alternatively be the virtual marking device used by the fieldworker or it may be another unit comprising processing circuitry such as a computer, mobile phone or tablet, or any other device that is suitable for this purpose.

Each of the 3D coordinates obtained by the processing circuitry of the system is associated with a respective object label that represents the pre-defined object type as described above. The association of the 3D coordinate with the object label may be performed while the fieldworker is placing the markers or may alternatively take place after the 3D coordinates have been obtained by the processing circuitry.

The processing circuitry then obtains a template volume to be applied to each 3D coordinate, either by the template volume already being a metadata that is associated with the marker for the object to which it refers or by a template volume that is stored in the processing circuitry or available to the processing circuitry being associated with the 3D coordinate. For an object such as a tree, for instance an oak tree, the template volume can be a specific volume that is deemed typical for an oak tree in general or it can alternatively be a volume for the specific oak tree that has been estimated by the fieldworker and associated with the marker on the oak tree as the marking took place.

Then an object volume is generated that comprises the 3D coordinate, by applying the template volume to the 3D coordinate. The thus generated object volume is labelled by assigning the object label of the 3D coordinate to all 3D coordinates located within the generated object volume.

This means that all points/3D coordinates that surround the obtained 3D coordinate on which the marker was applied are labelled with the same label as that 3D coordinate, as long as the points/3D coordinates are located within the generated object volume. A volume may in this context be a continuous volume, or a volume built up by a continuous group of discrete points/3D coordinates, the group for example defined by all 3D coordinates in the group being within one or more maximum distance, in one or more respective direction, to the pre-labelled 3D coordinate. For the oak tree mentioned above, this means that all points/3D coordinates that are within the volume deemed typical for oak trees or within the volume that has been estimated as a real volume for that particular tree are marked with the label. As a result, around each obtained pre-labelled 3D coordinate that corresponds to a marker placed on a real world object a volume of 3D coordinates that are also deemed as belonging to that object are labelled as being so.

After each of the pre-labelled 3D coordinates obtained by the processing circuitry have been assigned object volumes comprising points that are assigned the same label as the pre-labelled 3D coordinate, a plurality of object volumes is achieved.

In this first example, a drone is used as the un-manned vehicle and is used to fly through the forest that forms the real world area and use sensors such as cameras to detect the pre-labelled 3D coordinates 430. The images from the camera are used to create an unlabelled point cloud 420 containing detected sensor data, which is then combined with the pre-labelled 3D coordinates 430 in the local coordinate system that the sensor data corresponds to, so that a labelled 3D representation 440 of the forest area can be achieved. By associating object volumes and labelling all 3D coordinates within those object volumes around each pre-labelled 3D coordinate, all 3D coordinates associated with a respective object volume in the labelled 3D representation 440 are labelled as belonging to the marked object in the real world area, meaning that objects such as trees, bushes, boulders or swamps in the real world can be recognized in the labelled 3D representation without requiring further manual, or other, labelling actions to be performed.

As a result, labelled 3D data representations of the real world objects are created, exemplified in FIG. 4 by the labelled 3D data representations 441, 442, 443 and 444, and the now labelled 3D representation 440 of the real world area with the labelled representations of the objects can be used in a number of applications. In FIG. 4, a non-limiting, and optional, application is exemplified in step 445 generation of AI training data.

As mentioned herein, besides the fact that the labelling takes so much time, attempting to perform manual labelling of 3D objects in a virtual 3D representation would further most likely not provide accurate labelling results. The reason is that the human eye is not as well adapted to detect objects and details in a virtual 3D representation as compared to detecting the same objects in the real world, due to low resolution of the 3D images/representations and also to artifacts that may occur in the image data. This is clear when regarding FIG. 4 and the unlabelled point cloud 420. There is no way for a human to be able to label any of the objects 441, 442, 443 or 444 in the virtual environment, or unlabelled virtual 3D representation, as there is simply not enough visible information for the human eye to recognize the species of the objects or even clearly distinguish them from their surroundings. Again, this is why the 3D data labelling according to embodiments herein, wherein volumes are associated with prelabelled 3D coordinates, achieves labelled 3D data not only in a time efficient manner but also achieves labelled 3D data that cannot be obtained using manual labelling of the unlabelled virtual 3D representation. Thereby, any training data generated based on labelled 3D data obtained according to embodiments presented herein is more precise and accurate than anything that could be achieved by manual labelling of the same unlabelled virtual 3D representation.

The same advantages are obtained in domains that need labelled 3D data for use-cases other than AI. As mentioned herein, the forestry industry is a good example of this since forestry companies often use 3D data to determine the most cost-effective routes to harvest commercial forests. It is too difficult and time consuming for the forestry fieldworker to transfer their real world observations into the virtual 3D environment using a computerized geoinformatics interface. By providing 3D data that includes site-specific object labels, using embodiments presented herein, this process is significantly simplified and the most cost-effective routes to harvest commercial forests can be determined with reduced time, reduced effort and increased accuracy due to knowledge obtained from the additional labelled 3D data that was obtained in the real world, using embodiment presented herein.

Of course, the disclosed solution can be highly personalized and adapted to contribute to any suitable purpose that requires objects to be efficiently recognized.

Example 2

Handheld RTK GPS Node Example

In this example, a fieldworker arrives at a site, also referred to herein as a real world area, where objects are to be marked so that labelled 3D data representations of them can be created. The fieldworker uses an RTK base station to set up a local coordinate system that covers the site where the objects are located. The RTK base station is also connected to the satellite GPS network, this establishes a high precision global coordinate system. In this embodiment, the site may be a forest as in Example 1 above, and as illustrated in FIG. 4 for ease of understanding, but it could alternatively be another type of area as well.

The fieldworker uses a mobile phone with an app as his digital marking device and first connects by means of the app to the RTK base station and to a secondary handheld RTK node that is movable. In the app, he describes each object type that he plans to label, and also describes the meta data for each object type and any extra input that he will need to add later. Different object types would have different volumes associated with them depending on a size and shape of objects of each particular object type. Some object types may also require more than one point/3D coordinate to encapsulate the individual object, such as two points along a tree trunk to define the growth angle of the tree trunk or a larger number of points to mark boundaries of a specific location within the site. One example of such a specific location could be a cultural heritage stonework that would require any given number of points to mark, for instance eight markers that are to be placed on a circumference of or at a distance around the stonework.

After the object types have been selected and associated with suitable metadata, the field worker surveys the site using the movable (handheld) RTK node. Objects that the fieldworker finds on site are marked by moving the handheld RTK node to the point where the object exists in the real world and then labelling that 3D coordinate with a label that corresponds to the type of object present at that location. In some cases, he is prompted by the RTK node to add input metadata for the object that he is marking, such as entering an estimated wood quality-class for a tree or the height of a specific bush. Another input may be a predetermined volume for objects of a specific object type, in order to determine if the object such as a particular species of tree is larger than average or smaller than average, and also possibly estimating the diameter of the tree trunk or other features of the tree such as the presence or lack of disease.

Once all objects that the fieldworker wanted to mark have been labelled with the handheld RTK node, the marks, in the form of labelled 3D coordinates represented in the local coordinate system of the real world area and being associated with object types, are stored as a file on the RTK node itself or in the app of the mobile phone or on a remote processing unit communicatively coupled to the RTK node or mobile phone. The information comprised in this file corresponds to the reference number 430 in the illustrative example in FIG. 4. The marks may possibly also be associated with other meta data such as a respective predefined template volume for the object type associated with each mark point, or 3D coordinate, height, width, or other size related information, etc, that has been added during the marking or pre-labelling process. In some embodiments presented herein, these points with metadata and volumes associated with 3D coordinates may correspond to the set of pre-labelled 3D coordinates described in connection with FIGS. 1 to 3. In some embodiments, a selection of one or more of the points with meta data and volumes associated with 3D coordinates may correspond to the set of pre-labelled 3D coordinates described in connection with FIGS. 1 to 3.

The fieldworker is now ready to build an entire RGB point cloud for the site using another RTK node that is mounted on a drone that has RGB camera and LiDAR sensors for RGB LiDAR data acquisition. The drone can be started using the app and sent into the site, either along a predetermined route, autonomously self-navigating, or controlled dynamically by the fieldworker. The drone conducts a survey of the site and creates a raw file that is not yet processed to become a point cloud.

Then, post processing of the data takes place, either in processing circuitry that is comprised in the drone or in another device such as the app on the mobile phone or in a remote processing device that obtains data from the drone. If processing takes place on the drone, the fieldworker uploads his file, containing the 3D coordinates, and possibly their meta-data, which may include associated volumes, that he created while marking the objects, to the drone. Conversely, the data may instead be uploaded to the mobile phone from the drone, or data from the drone as well as from the mobile phone app may be uploaded to a remote processing unit, typically having higher computational power than the mobile phone/handheld device or drone, for further processing.

The processing circuitry uses for example sensor fusion and SLAM (Simultaneous Localization And Mapping) to create an unlabelled point cloud that represents an RGB digital twin of the real world area, or site. In the illustrative example in FIG. 4 the unlabelled point cloud is reference number 420. The processing circuitry also combines, illustrated in FIG. 4 as processing step 435, the unlabelled point cloud 420 with data from the mobile phone that contains the markers or information regarding the marking, represented in FIG. 4 as the set 430 of prelabelled 3D coordinates. Object type classifications and any associated metadata (additional data) are applied in the point cloud to points/3D coordinates that fall within the respective object volume associated with each label. As a result, a labelled point cloud file is created (.txt, .las, or similar) that comprises coordinates, RGB and the object type classifications. In FIG. 4 this is illustrated as the labelled 3D representation 440.

One application for the created labelled point cloud file, or other labelled virtual 3D representation, 440 is as input for a harvester that needs to navigate the site in order to harvest some of the labelled objects. Another application is to train AI to recognize the labelled objects. Yet another application is to generate a very high number (possibly tens or hundreds of thousands, or even millions, depending on the application) of labelled, projected 2D images that are acquired from virtual cameras that are placed into the 3D space formed by the point cloud. These virtually generated 2D images can subsequently be used to train new AI classifications of objects that are site-specific to the precise use-case that the field worker originally intended when gathering the original pre-labelled volumes in the first instance.

In one particularly advantageous application of the invention, the above example may be used to train an AI to recognize particular species of flora in a forest so that the AI can then be used on sites where objects have not been labelled to recognize those species automatically. One such situation would be where one particular species of tree is to be harvested in a very large forest area such as 10 000 ha. At the same time, some species within that forest area are to be protected and not harvested or damaged by the harvester.

The above example may then be used by fieldworkers to manually label a selection of objects or species in some sites within that very large forest area and then training an AI to automatically label similar objects or species in the remaining area. This would be done by the fieldworkers marking for example some instances of species that are to be harvested as well as the species that is/are to be protected on for example only 10 ha of the full 10 000 ha site. The resulting point clouds achieved as described above can then be used for obtaining labelled 3D data according to any of the embodiments presented herein, and possibly further to generate AI training data based on the obtained labelled 3D data and to train an AI, using the training data, to recognize objects of those harvestable and protected species' even in the remaining 9 990 ha of forest where they have not been manually marked, or pre-labelled, by fieldworkers. Using the newly trained AI to label the vast majority of the 10 000 ha site and plan harvesting in this very large forest area then gives the possibility of efficiently harvesting the desired species without harming those trees, bushes or flowers that are to be left untouched, or possibly to ensure that a highest given percentage of them remain in place after harvesting is completed. As such, the invention enabled the protection of plant species and the efficient precision harvest of a 10 000 ha site even though only 10 ha of the site was manually marked by fieldworkers.

Example 3

In this example, a fieldworker uses four radio localization array posts to mark corners of a site and thereby define the area between those array posts as the site where the invention is to be used and to create a locational system there. The locational array may include a GPS so that radio localization coordinates can be transferred into global coordinates. In the locational array, the fieldworker describes each object type that he plans to label, assigning RFID tags to those object types. In this example, the RFID tags have visual differences such as color coding to ensure that the fieldworker easily can tell them apart. Each color can then represent a different object type. The RFID tags used may be biodegradable.

Metadata may be assigned to each object type as disclosed in the examples above, and the RFID tags are then placed on the objects that are to be marked. Different object types have different volumes associated with them as mentioned above. Once all the objects are marked, a drone with for example an RGB sensor and a LiDAR sensor is used to survey the site and cover the whole area within the locational array. The drone uses an on-board RFID tag reader to observe the location of any nearby RFID tags, and then processes the location of each tag and make a note that all RBG survey points that lie within the predetermined volume of that object are to be labelled with that specific object type. The data gathered by the drone is then processed as described above in the previous examples, and the points surrounding the points where RFID tags are located as assigned the same label as the object type that the RFID tag itself denotes, as long as those points are located within the predetermined volume.

After processing, a point cloud file is created that comprises coordinates, RGB and the object type labels for the representations of each object labelled as belonging to the object types.

Example 4

In this example, a plurality of tags such as AprilTags that are biodegradable and that are each associated with a unique ID are used to mark objects in the way described in the examples above. An un-manned vehicle in the form of a drone with for example an RGB sensor, a LiDAR sensor, and camera system that can read AprilTags is used to survey the area, and a labelled point cloud is then generated by combining data from the survey with data from the AprilTags. Since the tags are biodegradable, they may be left on site afterwards.

For each example above, features have been described that are used to prepare for and perform the invention. It is to be noted that those features may also be combined with features from other examples as long as such combinations are not explicitly stated as unsuitable.

In the examples 1-3 above, each hand-held device, labelling device, virtual marking device used by a field worker, digital device used by a field worker etc. may be understood as a handheld user device 600, as described in connection with FIG. 6.

System Architecture

System embodiments will now be described with reference to FIG. 1.

Figure 1:
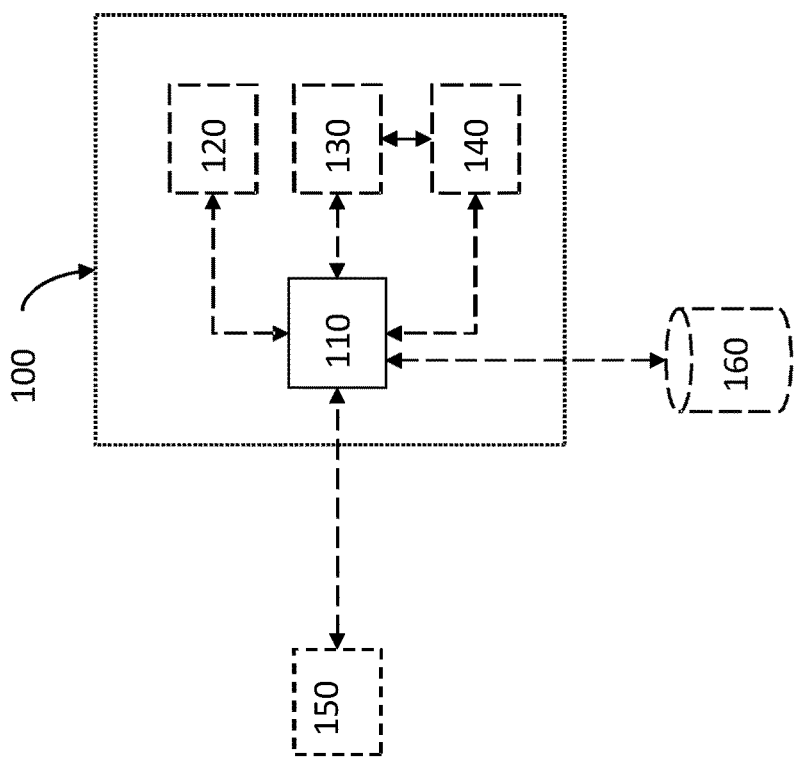

FIG. 1 shows a system 100 for generating labelled 3D data representations of real world objects. The system 100 comprises processing circuitry 110 configured to obtain a set of one or more pre-labelled 3D coordinate, each 3D coordinate in the set of one or more pre-labelled 3D coordinate representing a point on a real world object in a real world area. Each 3D coordinate in the set of one or more pre-labelled 3D coordinate is defined in a three-dimensional, 3D, local coordinate system. Each 3D coordinate in the set of one or more pre-labelled 3D coordinate is further associated with a respective object label representing a pre-defined object type.

The 3D local coordinate system may be defined according to any suitable representation, including but not limited to using global positioning system (GPS) coordinates, a 3D array, AprilTags or other optical localization schemes, RFID tags, QR codes, radio localization, or any combination thereof.

The pre-labelled coordinates may have been labelled by a human performing labelling/marking in the real world area prior to embodiments of this invention, either manually or using a therefor adapted electronic user device 150. Such a user device may be handheld or wearable and may in some cases comprise virtual reality, augmented reality or mixed reality functionality. The processing circuitry 110 may in turn be configured to obtain the set of one or more pre-labelled 3D coordinate by receiving one or more pre-labelled 3D coordinate each representing a point on a real world object from such a user device 150 localized within the 3D local coordinate system.

The pre-labelled coordinates may alternatively, or in combination, have been labelled by an unmanned vehicle moving within the real world area. The unmanned vehicle may be configured according to the alternatives presented in connection with FIGS. 5A and 5B, or any other type of unmanned vehicle. Each object label may be derived based on a physical marker associated with a physical location on the real world object, or on a digital marker associated with a digital position defined in the local coordinate system.

The processing circuitry 110 is configured to, for each of the one or more pre-labelled 3D coordinates in the obtained set: obtain a template volume to be applied to the 3D coordinate; generate an object volume comprising the 3D coordinate by applying the obtained template volume to the 3D coordinate; and label the generated object volume by assigning the object label of the pre-labelled 3D coordinate to all 3D coordinates located within the generated object volume.

Thereby, labelled 3D data representations of real world objects, represented in a 3D scene/map/point cloud or other similar context, are obtained without any manual processing of the captured sensor data/images. The labelled 3D data can then be used for producing any number of 2D and/or 3D training images or other forms of AI training data, in manners known in the art.

Turning now to FIG. 6, a schematic overview of a handheld user device 600 for generating labelled 3D data representations of real-world objects is shown. The handheld user device 600 is configured to be localized in a three-dimensional, 3D, local coordinate system, in any of the manners described herein. The handheld user device 600 comprises processing circuitry 610 configured to generate a set of one or more pre-labelled 3D coordinate, each 3D coordinate in the set of one or more pre-labelled 3D coordinate representing a point on a real world object in a real world area, wherein each 3D coordinate in the set of one or more pre-labelled 3D coordinate is defined in the three-dimensional, 3D, local coordinate system. Each 3D coordinate in the set of one or more pre-labelled 3D coordinate is also associated with a respective object label representing a pre-defined object type. The processing circuitry 610 is further configured to, for each of the one or more pre-labelled 3D coordinates in the obtained set, obtain or generate a template volume to be applied to the 3D coordinate and generate an object volume comprising the 3D coordinate by applying the obtained template volume to the 3D coordinate. The obtaining of a template volume to be applied to the 3D coordinate and generating an object volume comprising the 3D coordinate by applying the obtained template volume to the 3D coordinate may be performed in any manner described herein.

The processing circuitry 610 of the handheld user device 600 may further be configured to label the generated object volume by assigning the object label of the pre-labelled 3D coordinate to all 3D coordinates located within the generated object volume, in any manner described herein. Alternatively, the processing circuitry 610 of the handheld user device 600 may be communicatively connected to the system 100 and configured to send one or more generated object volume and any relevant associated data to the processing circuitry 110. In these embodiments, the processing circuitry 110 is configured to receive one or more generated object volume from and label each generated object volume by assigning the object label of the pre-labelled 3D coordinate to all 3D coordinates located within the generated object volume.

Thereby, labelled 3D data representations of real world objects, represented in a 3D scene/map/point cloud or other similar context, are obtained without any manual processing of the captured sensor data/images. The labelled 3D data can then be used for producing any number of 2D or 3D training images or other forms of AI training data, in manners known in the art.

The functionality of the components of the handheld user device 600 are similar to the functionality of the corresponding components of the system 100. Therefore, corresponding components are commonly described below.

The handheld user device 600 and the system 100 may optionally be combined, in that the handheld user device 600 may in some embodiments be the electronic user device 150 providing input to the system 100, or, in some other embodiments, the system 100 may be integrated in the handheld user device 600. In embodiments where the system 100 is integrated in the handheld use device 600, the processing circuitry 110 and the processing circuitry 610 are the same.

In different embodiments, a single pre-labelled 3D coordinate may have been assigned to an object instance of a pre-defined object type, i.e. representing a specific object in the real world area, or two or more pre-labelled 3D coordinates may have been assigned to the same object instance, before they are input into the system and method according to embodiments presented herein.

Cases where a single pre-labelled 3D coordinate has been assigned to an object instance include when the 3D coordinate in a preceding step has been assigned to the real world object (object instance) e.g. at an approximated centre of the object, or at a specified location on the surface of the object and additional data defining the location of the 3D coordinate in relation to the associated object, possibly including information about the 3D coordinate being added at the centre or at the surface of the object, the height, width, diameter and/or other size or shape related data, has also been input and associated with the 3D coordinate. The additional data may also comprise information on the orientation in which the template volume is to be applied to the 3D coordinate. A volume may in this context be a continuous volume, or a volume built up by a continuous group of discrete points/3D coordinates, the group for example defined by all 3D coordinates in the group being within one or more maximum distance, in one or more respective direction, to the pre-labelled 3D coordinate. If the volume is a continuous group of discrete points/3D coordinates defined by all 3D coordinates in the group being within one or more maximum distance, in one or more respective direction, to the pre-labelled 3D coordinate the additional data may also comprise information on the one or more distance and associated respective direction. The additional data defining the location of the 3D coordinate in relation to the associated object may be used in generating and possibly scaling or further adapting the object volume to represent the real world object in a sufficiently accurate manner, according to embodiments presented herein. In some embodiments, the processing circuitry 110 may be configured to, when applying the template volume to the pre-labelled 3D coordinate, scale the template volume in relation to a determined size of the object.

Cases where two or more pre-labelled 3D coordinates have been assigned to the same object instance include cases when a first of the two or more 3D coordinates have in a preceding step been assigned to the real world object (object instance) e.g. at a location near the base of the object or at a specified first height, and at least one other 3D coordinate has been assigned to the real world object at different location, whereby additional information may include information about the two or more 3D coordinates being indicative of the direction of the extension and in applicable cases orientation of the object. This is especially useful if the object is elongated. Cases where two or more pre-labelled 3D coordinates have been assigned to the same object instance may further include cases when two or more 3D coordinates have in a preceding step been assigned to the real world object (object instance) at different locations on the objects surface, e.g. surrounding the object at approximately the same height from the ground. In these cases, additional data defining the location of the two or more 3D coordinates in relation to the associated object, possibly including information about the 3D coordinates defining the outer perimeter of the object and/or information about the height, shape or other relevant information, may also have been input and associated with the 3D coordinates and/or object. Cases where two or more pre-labelled 3D coordinates have assigned to the same object instance may further include cases when two or more 3D coordinates have in a preceding step been assigned to the real world object (object instance) by a user using virtual reality, augmented reality, or mixed reality, and thereto connected input functionality to "paint" on the real world object as depicted in the virtual, augmented or mixed reality representation, whereby all 3D coordinates in the local coordinate system that are "painted on", coloured or marked in another suitable manner by the user via user input functionality, and form a continuous area or volume, are pre-labelled as being assigned to the same real world object (object instance). Additional information may in these cases comprise information that the 3D coordinates assigned to the same object instance form a volume that is to be used as the template volume for this object instance. The additional information may further comprise information that the template volume is to be applied directly, i.e. the generated object volume will correspond to the template volume in this case, or that the object volume is to be generated based on the template volume according to other rules and specifications, including additional processing of the volume. In all of the alternative cases presented above, the additional data may also comprise information on the orientation in which the template volume is to be applied to the 3D coordinates associated with the object instance, and information defining the location of one or more of the 3D coordinates in relation to the associated object. The additional data defining the location of one or more 3D coordinate in relation to the associated object may be used in generating and possibly scaling or further adapting the object volume to represent the real world object in a sufficiently accurate manner, according to embodiments presented herein.

In one or more embodiment, the system 100 may further comprise one or more local memory 120 and/or be communicatively connected to one or more external memory or database 160. Similarly, in one or more embodiment, the handheld user device 600 may further comprise one or more local memory 620 and/or be communicatively connected to one or more external memory or database 160. The one or more local memory 120, 620 and/or the one or more external memory 160 may be configured to store data, such as the set of pre-labelled coordinates and information associated with the respective coordinate in the set, and/or template volumes.

The processing circuitry 110 may be configured to obtain the set of pre-labelled coordinates by receiving or retrieving the set of pre-labelled coordinates from the local memory 120, and/or one or more external memory or database 160. Similarly, the processing circuitry 610 may be configured to obtain the set of pre-labelled coordinates by receiving or retrieving the set of pre-labelled coordinates from the local memory 620, and/or one or more external memory or database 160.

The processing circuitry 110 may be configured to obtain at least one template volume by receiving or retrieving it from the local memory 120 of the system 100, or an external memory or database 160 communicatively connected to the system 100. Similarly, the processing circuitry 610 may be configured to obtain at least one template volume by receiving or retrieving it from the local memory 620 of the handheld user device 600, or an external memory or database 160 communicatively connected to the handheld user device 600.

In some embodiments, at least one template volume may be a pre-determined volume defined for each object type. In these embodiments, the memory 120, 620 and/or the external memory 160 may be configured to store one or more template volume and information about the association of each stored template volume to an object type. The processing circuitry 110 may in turn be configured to obtain one or more template volume and information about the association of each stored template volume to an object type, by receiving or retrieving it, from the memory 120 or external memory 160. The processing circuitry 110 may in these embodiments further be configured to apply the template volume to the 3D coordinate by applying the pre-determined volume associated with the object type of the 3D coordinate. The processing circuitry 110 may further be configured to receive or retrieve the pre-determined template volume associated with the object type of the 3D coordinate from a lookup table or database, stored in a local memory 120 or external memory 160, based on the object type associated with the pre-labelled coordinate. Similarly, the processing circuitry 610 may in turn be configured to obtain one or more template volume and information about the association of each stored template volume to an object type, by receiving or retrieving it, from the memory 620 or external memory 160. The processing circuitry 610 may in these embodiments further be configured to apply the template volume to the 3D coordinate by applying the pre-determined volume associated with the object type of the 3D coordinate. The processing circuitry 610 may further be configured to receive or retrieve the pre-determined template volume associated with the object type of the 3D coordinate from a lookup table or database, stored in a local memory 620 or external memory 160, based on the object type associated with the pre-labelled coordinate.

In some embodiments, the processing circuitry 110 may be configured to obtain one or more template volume by performing image analysis in the form of object recognition to identify points/pixels/voxels in a virtual 3D representation of at least one object from the real world area as being a part of the same object. Similarly, in some embodiments, the processing circuitry 610 may be configured to obtain one or more template volume by performing image analysis in the form of object recognition to identify points/pixels/voxels in a virtual 3D representation of at least one object from the real world area as being a part of the same object.

In some embodiments, one or more template volume may be generated based on input from a user, e.g. as described above regarding "drawing" on the object using virtual reality, augmented reality or mixed reality functionality. The processing circuitry 610 of the handheld user device 600 may be configured to generate one or more template volume based on registered movements of the handheld user device 600, caused by the user moving the device 600 to indicate, "draw", the volume. In some embodiments, the handheld user device 600 may comprise at least one accelerometer or other device for registering movements or changes in position of the handheld user device 600 in three dimensions. Alternatively, the template volume may be selected based on input from a user, e.g. from a menu of selectable options presented to the user via a user interface 130 that may be comprised in the system 100, or a user interface of a user device 150 external to, and communicatively coupled to, the system 100, or a user interface 630 of the handheld user device 600. If a user interface 130 comprised in the system is used, the user interface 130 and the processing circuitry 110 may be connected to a display 140 configured to present information to a user of the system 100. If a user interface of a user device 150 external to, and communicatively coupled to, the system 100 is used, the user interface 130 and the processing circuitry 110 may be connected to a display of the user device 150 configured to present information to a user and/or be connected to a display 140 configured to present information to a user of the system 100. If a user interface 630 of the handheld user device 600 is used, the user interface 630 and the processing circuitry 610 may be connected to a display 640 configured to present information to a user of the handheld user device 600.

The processing circuitry 110 may be configured to control the presentation of information on the display 140, either by controlling the display 140 directly, or by controlling the display 140 via the user interface 130. Similarly, the processing circuitry 610 may be configured to control the presentation of information on the display 640, either by controlling the display 640 directly, or by controlling the display 640 via the user interface 630.

The processing circuitry 110 and/or 610 may in any of these embodiments be configured to apply the template volume to the 3D coordinate by applying the selected or in other manner generated volume to the 3D coordinate.

Applying the obtained template volume to the 3D coordinate may be done in many alternative manners. In the case where there is a single pre-labelled 3D coordinate representing a real world object, the pre-labelled 3D coordinate may represent the center of the real world object, a point on the outer surface of the real world object, the lowest or highest point on the real world object, or another suitable point related to the real world object. In one embodiment, the processing circuitry 110 and/or 610 may be configured to interpret the pre-labelled 3D coordinate as the centre of the object and apply the template volume centred around the pre-labelled 3D coordinate. In some embodiments, the processing circuitry 110 and/or 610 may obtain further information, which may e.g. have been input at the same time as the pre-labelled 3D coordinate was generated, defining how the template volume should be applied in relation to the pre-labelled 3D coordinate. In cases where two or more pre-labelled 3D coordinates are associated and thereby represent the same real world object, the two or more pre-labelled 3D coordinates may represent e.g. two or more points on the outer surface of the real world object, two or more points indicating the longitudinal direction of an elongated object, or the like. In these embodiments, the processing circuitry 110 and/or 610 may obtain further information, which may e.g. have been input at the same time as the pre-labelled 3D coordinate was generated, defining how the template volume should be applied in relation to the two or more pre-labelled 3D coordinates. In all embodiments wherein there are two or more pre-labelled 3D coordinates representing a single real world object, the processing circuitry 110 and/or 610 is configured to generate the object volume to comprise the two or more 3D coordinates by applying the obtained template volume to the two or more 3D coordinate. In other words, the two or more 3D coordinates will in this case be comprised in the generated object volume.

In some embodiments the object volume can instead be generated by applying the obtained template volume to the one or more 3D coordinates in such a way that the one or more 3D coordinates are not comprised in the generated object volume. The one or more 3D coordinates can instead be adjacent to, bordering on or at a predetermined distance from the generated object volume. It may also be the case that at least one 3D coordinate is comprised in the generated object volume and that at least one other 3D coordinate is not.

As mentioned above, the processing circuitry 110 and/or 610 is configured to label the generated object volume by assigning the object label of the pre-labelled 3D coordinate to all 3D coordinates located within the generated object volume. Thereby, suitably, an automatic labelling of a large number of 3D coordinates is achieved without any additional manual step required, in a fast and in-expensive manner.

The processing circuitry 110 and/or 610 may in one or more embodiment further be configured to generate a point cloud, 3D map or other 3D representation comprising the labelled object volumes after the 3D coordinates comprised one or more object volume, respectively, have been labelled. Alternatively, if a point cloud, 3D map or other 3D representation is already available, the processing circuitry 110 and/or 610 may be configured to update the point cloud, 3D map or other 3D representation to include the labelled object volumes. Thereby, advantageously a point cloud, 3D map or other 3D representation comprising labelled 3D object data is obtained. Including the labelled object volumes may mean that each labelled 3D coordinate is translated into corresponding points in the coordinate system of the point cloud, 3D map or other 3D representation. Alternatively, the 3D coordinates of the labelled object volumes may be represented in another suitable manner in the point cloud, 3D map or other 3D representation, for example as voxels, volumes, shells/surfaces, polygonal meshes etc., or any combination thereof.

In one or more embodiments, the processing circuitry 110 and/or 610 may further be configured to generate training data for an artificial intelligence network using the point cloud, 3D map or other 3D representation, by generating 2D or 3D images of one or more of the labelled object volumes within said point cloud, 3D map or other 3D representation. The 2D or 3D images may be generated from viewpoints at different angles, distances and directions from the one or more of the labelled object volumes within said point cloud, 3D map or other 3D representation, using at least one virtual camera. Of course, different lighting, reflection, texture modifications etc. may be used to further increase the possibilities of obtaining many different 2D or 3D image representations as training data from each labelled object volume.

Alternatively, or in combination, the processing circuitry 110 and/or 610 may be configured to generate training data for an artificial intelligence (AI) network using the point cloud, 3D map or other 3D representation, wherein the training data is in the form of at least part of the point cloud, 3D map or other 3D representation and the AI network is configured to be trained using such input point cloud data, 3D map or other 3D representation.

The processing circuitry 110 and/or 610 may for example comprise one or more processors. The processor(s) may for example be application-specific integrated circuits (ASIC) configured to perform a specific eye tracking and position determination method. Alternatively, the processor(s) may be configured to execute instructions (for example in the form of a computer program) stored in one or more memories, e.g. in a memory 120 comprised in the system 100, a memory 620 comprised in the handheld user device 600, or in a memory 160 external to (for example located remotely from) and communicatively connected to the system 100 or handheld user device 600. The memory 120, 620, 160 may store instructions for causing the system 100 or handheld user device 600 to perform a method according to any of the embodiments presented in connection with FIGS. 2 and 3.

The processing circuitry 110 and/or 610 may in one or more embodiment be configured to perform any or all of the method embodiments described in connection with FIGS. 2 and 3.

It will be appreciated that the system 100 embodiments described above with reference to FIG. 1 are provided as examples, and that many other systems may be envisaged.

In one or more specific embodiment, the set of one or more pre-labelled 3D coordinate may, before it is obtained by the processing circuitry 110, have been generated by an expert user or an unmanned vehicle performing object marking according to any of the solutions disclosed in the previously filed Swedish patent application 1950817-5, which is hereby incorporated in its entirety.

Figure 5A:
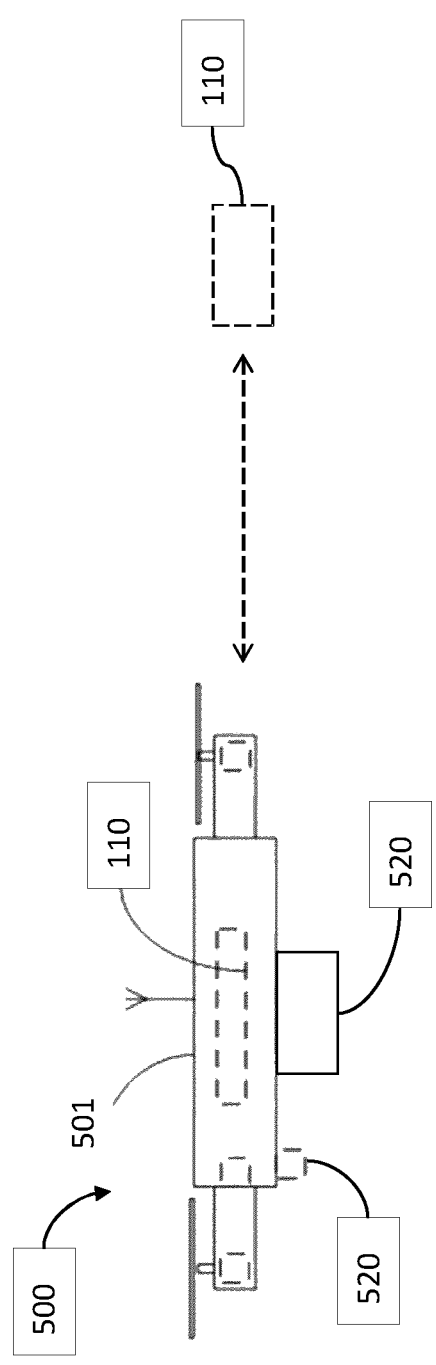
FIGS. 5A and 5B show two exemplary embodiments of an un-manned vehicle.
Figure 5B:
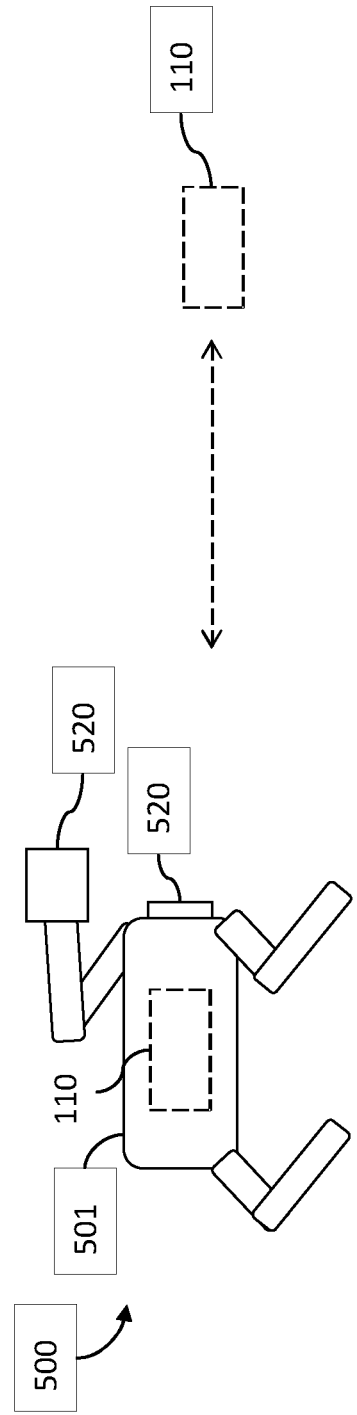

Turning now to FIGS. 5*a* and 5*b*, there are shown two exemplary embodiments of an un-manned vehicle 500. In all embodiments herein, the un-manned vehicle 100 comprises: a body 501; and at least one sensor 520, e.g. including one or more imaging sensor, configured to obtain information associated with a real world object in a defined real world area. The un-manned vehicle 500 comprises or is communicatively connected to the processing circuitry 110 or system 100, and/or is communicatively connected to the processing circuitry 610 or the handheld user device 600. The un-manned vehicle 500 may be an un-manned aerial vehicle, as illustrated in FIG. 5*a*, or an un-manned ground-based vehicle, as illustrated in FIG. 5*b*. Alternatively, the un-manned vehicle may be configured to be submersible. In different embodiments, the un-manned vehicle 500 may be configured to be remote controlled or may be an autonomous vehicle.

In one or more embodiment, wherein at least one un-manned vehicle 500 comprises or is connected to the processing circuitry 110 and/or 610, the processing circuitry 110 and/or 610 may further be configured to receive sensor data from at least one sensor located on an un-manned vehicle moving through the real world area, and obtain the set of one or more pre-labelled 3D coordinate based on sensor data received from at least one of said sensors.

Method Embodiments

Figure 2:
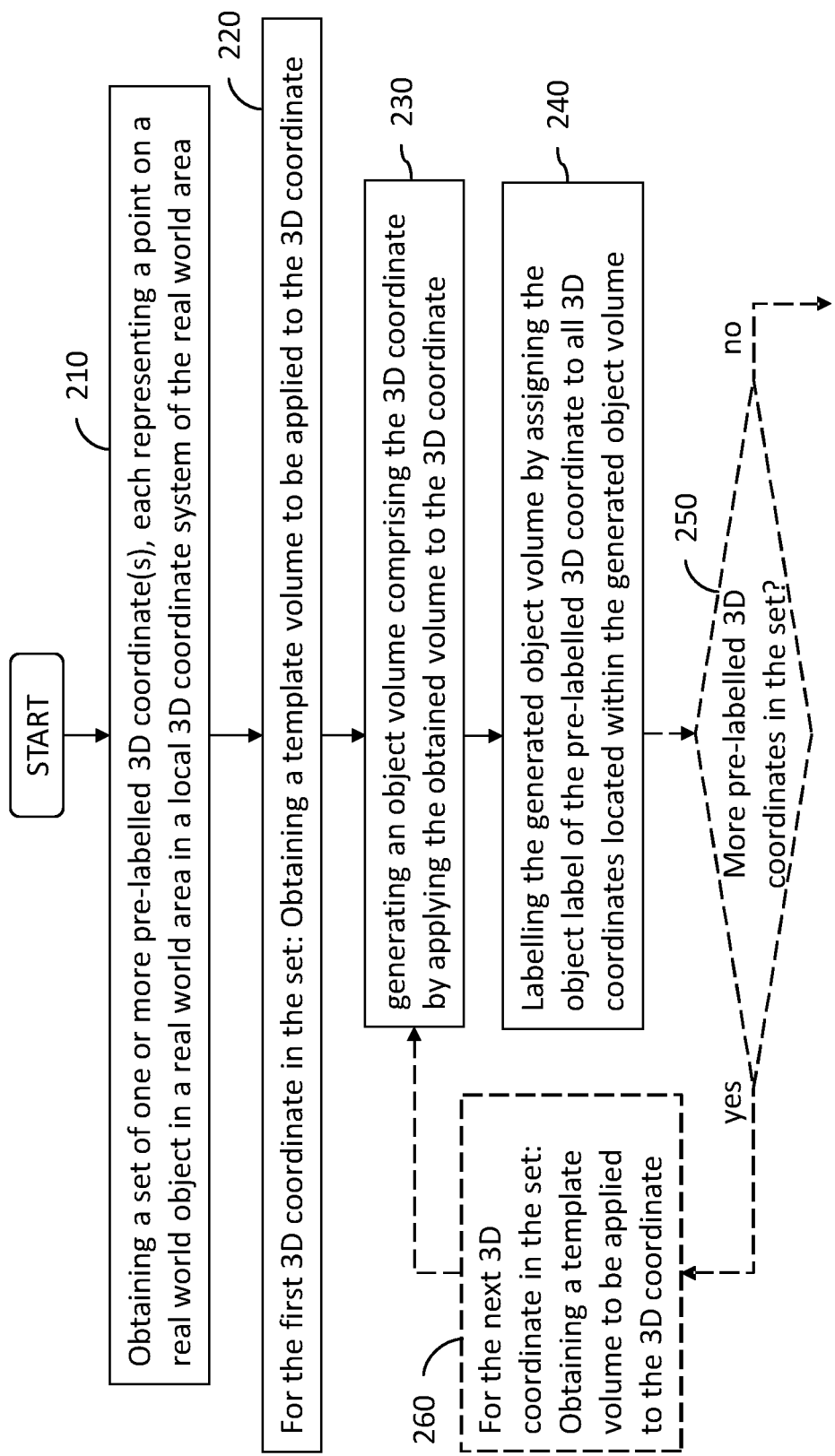
FIG. 2 is a flow chart of a method for generating labelled 3D data representations of real-world objects, according to one or more embodiments.

Turning now to FIG. 2, there are shown embodiments of a computerized method for generating labelled 3D data representations of real-world objects. The method comprises:

In step 210: obtaining, using processing circuitry 110, a set of one or more pre-labelled 3D coordinate, each 3D coordinate in the set of one or more pre-labelled 3D coordinate representing a point on a real world object in a real world area.

Each 3D coordinate in the set of one or more pre-labelled 3D coordinate is defined in a3D local coordinate system of the real world area.

Each 3D coordinate in the set of one or more pre-labelled 3D coordinate is further associated with a respective object label representing a pre-defined object type.

Obtaining the set of one or more pre-labelled 3D coordinate may in one or more embodiments comprise receiving one or more pre-labelled 3D coordinate each representing a point on a real world object from a user device 150 localized within the 3D local coordinate system. In other embodiments, the method may comprise receiving, in the processing circuitry 110, sensor data from at least one sensor located on an un-manned vehicle moving through the real world area, wherein the set of one or more pre-labelled 3D coordinate is obtained based on sensor data received from at least one of said sensors.

Each object label associated with a pre-labelled 3D coordinate may be derived based on a physical marker associated with a physical location on the real world object or based on a digital marker associated with a digital position defined in the local coordinate system.

In step 220: for the first 3D coordinate in the set: obtaining a template volume to be applied to the 3D coordinate using the processing circuitry 110.

In step 230: generating an object volume comprising the 3D coordinate, using the processing circuitry 110, by applying the obtained template volume to the 3D coordinate.

Applying the obtained template volume to the pre-labelled 3D coordinate may, when applicable, comprise scaling the template volume in relation to a determined size of the object, e.g. based on additional data associated with the pre-labelled 3D coordinate or the object type.

In one or more embodiments, applying the obtained template volume to the pre-labelled 3D coordinate comprises applying a pre-determined template volume associated with the object type of the pre-labelled 3D coordinate.

In some embodiments, the pre-determined template volume associated with the object type of the pre-labelled 3D coordinate may have a pre-determined shape representative of a generic object of the object type.

In step 240: labelling the generated object volume, using the processing circuitry 110, by assigning the object label of the pre-labelled 3D coordinate to all 3D coordinates located within the generated object volume.

In step 250: checking if there are more pre-labelled 3D coordinates in the obtained set of one or more pre-labelled 3D coordinate.

If there are more pre-labelled 3D coordinates in the obtained set of one or more pre-labelled 3D coordinate, the method continues with step 260.

In step 260: for the next 3D coordinate in the set: obtaining a template volume to be applied to the 3D coordinate using the processing circuitry 110.

After step 260, the method returns to step 230.

Through the iterative application of step 230, an object volume will be generated for each pre-labelled 3D coordinate in the set of one or more pre-labelled 3D coordinate, or an object volume will be generated for each object instance with which one or more pre-labelled 3D coordinate is associated as described in connection with FIG. 1. Furthermore, through the iterative application of step 240, all 3D coordinates located within each of the generated object volumes will be automatically labelled in a time efficient and sufficiently accurate, without the need of any extra manual labelling at this stage.

If there are no more pre-labelled 3D coordinates in the obtained set of one or more pre-labelled 3D coordinate, the method ends. However, in some embodiments presented in FIG. 3, the method may optionally continue in step 310 or 320, wherein the method further comprises:

In optional step 310: generating, using the processing circuitry 110, a point cloud, 3D map or other 3D representation comprising the labelled object volumes.

In optional step 310: updating, using the processing circuitry 110, a point cloud, 3D map or other 3D representation to include the labelled object volumes.

After step 310 or 320, the method may continue in step 330.

In optional step 330: generating, using the processing circuitry 110, training data for an artificial intelligence network based on the point cloud, 3D map or other 3D representation, by generating 2D and/or 3D images of one or more of the labelled object volumes within said point cloud, 3D map or other 3D representation from different viewpoints using at least one virtual camera.

Alternatively, or in combination, step 330 may comprise, using the processing circuitry 110, generating training data for an artificial intelligence (AI) network by selecting at least a part of the available point cloud data, 3D map data or other 3D representation data.

The method steps and functions described in connection as performed by processing circuitry 110 of system 100 may instead be performed by the processing circuitry 610 of the handheld user device 600 in embodiments comprising the handheld user device 600.

Further Embodiments

In one or more embodiment, there is provided a non-transitory computer-readable storage medium storing instructions which, when executed by processing circuitry 110 of the system 100, cause the system 100 to perform the method as defined in any of the method embodiments disclosed herein (in other words, in the claims, the summary, or the detailed description).

The non-transitory computer-readable storage medium may store instructions which, when executed by processing circuitry 110 of the system 100, cause the system 100 to: obtain a set of one or more pre-labelled 3D coordinate, each 3D coordinate in the set of one or more pre-labelled 3D coordinate representing a point on a real world object in a real world area, wherein each 3D coordinate in the set of one or more pre-labelled 3D coordinate is defined in a three-dimensional, 3D, local coordinate system, and wherein each 3D coordinate in the set of one or more pre-labelled 3D coordinate is associated with a respective object label representing a pre-defined object type; and for each of the one or more pre-labelled 3D coordinates in the obtained set: obtain a template volume to be applied to the 3D coordinate; generate an object volume comprising the 3D coordinate by applying the obtained template volume to the 3D coordinate; and label the generated object volume by assigning the object label of the pre-labelled 3D coordinate to all 3D coordinates located within the generated object volume.

The non-transitory computer-readable storage medium may further store instruction which, when executed by processing circuitry 110 of the system 100 for generating labelled 3D data representations of real-world objects, cause the system 100 to perform the method steps of any of the embodiments presented in connection with FIG. 2 or 3.

Alternatively, or in combination, there is in one or more embodiment provided a non-transitory computer-readable storage medium storing instructions which, when executed by processing circuitry 610 of the handheld user device 600, cause the user device 600, to perform the method as defined in any of the method embodiments disclosed herein (in other words, in the claims, the summary, or the detailed description).

The non-transitory computer-readable storage medium may store instructions which, when executed by processing circuitry 610 of the handheld user device 600, cause the handheld user device 600, to: obtain a set of one or more pre-labelled 3D coordinate, each 3D coordinate in the set of one or more pre-labelled 3D coordinate representing a point on a real world object in a real world area, wherein each 3D coordinate in the set of one or more pre-labelled 3D coordinate is defined in a three-dimensional, 3D, local coordinate system, and wherein each 3D coordinate in the set of one or more pre-labelled 3D coordinate is associated with a respective object label representing a pre-defined object type; and for each of the one or more pre-labelled 3D coordinates in the obtained set: obtain a template volume to be applied to the 3D coordinate; and generate an object volume comprising the 3D coordinate by applying the obtained template volume to the 3D coordinate.

In some embodiments, the non-transitory computer-readable storage medium may further store instructions which, when executed by processing circuitry 610 of the handheld user device 600, cause the handheld user device 600, to label the generated object volume by assigning the object label of the pre-labelled 3D coordinate to all 3D coordinates located within the generated object volume.

The non-transitory computer-readable storage medium may further store instruction which, when executed by processing circuitry 610 of the handheld user device 600 for generating labelled 3D data representations of real-world objects, cause the handheld user device 600 to perform the method steps of any of the embodiments presented in connection with FIG. 2 or 3.

The invention claimed is:

1. A computerized method for generating labelled three dimensional, 3D, data representations of real-world objects, comprising:
   obtaining, using processing circuitry (110), a set of one or more pre-labelled 3D coordinate, each 3D coordinate in the set of one or more pre-labelled 3D coordinate representing a point on a real world object in a real world area,
   wherein each 3D coordinate in the set of one or more pre-labelled 3D coordinate is defined in a 3D local coordinate system of the real world area,
   wherein each 3D coordinate in the set of one or more pre-labelled 3D coordinate is associated with a respective object label representing a pre-defined object type,
   wherein each object label is derived based on a marker associated with a position defined in the 3D local coordinate system and each marker is a tag to a location where the object is in the real world;
   for each of the one or more pre-labelled 3D coordinates in the obtained set:
   obtaining a 3D template volume to be applied to the 3D coordinate using the processing circuitry (110);
   generating a 3D object volume comprising the 3D coordinate, using the processing circuitry (110), by applying the obtained 3D template volume to the 3D coordinate; and
   labelling the generated 3D object volume, using the processing circuitry (110), by assigning the object label of the pre-labelled 3D coordinate to all 3D coordinates located within the generated 3D object volume.

2. The method of claim 1, wherein obtaining a template volume to the pre-labelled 3D coordinate comprises obtaining a pre-determined template volume associated with the object type of the pre-labelled 3D coordinate.

3. The method of claim 2, wherein the pre-determined template volume associated with the object type of the pre-labelled 3D coordinate has a pre-determined shape representative of a generic object of the object type.

4. The method of claim 1, wherein applying the obtained template volume to the prelabelled 3D coordinate further comprises scaling the template volume in relation to a determined size of the object.

5. The method of claim 1, further comprising:
   receiving, in the processing circuitry (110), sensor data from at least one sensor located on an un-manned vehicle moving through the real world area,
   wherein the set of one or more pre-labelled 3D coordinate is obtained based on sensor data received from at least one of said sensors.

6. The method of claim 1, further comprising generating, using the processing circuitry (110), a point cloud, 3D map or other 3D representation comprising the labelled object volumes.

7. The method of claim 6, further comprising generating, using the processing circuitry (110), training data for an artificial intelligence network based on the point cloud, 3D map or other 3D representation, by generating two dimensional, 2D, images of one or more of the labelled object volumes within said point cloud, 3D map or other 3D representation from different viewpoints using at least one virtual camera.

8. The method of claim 6, further comprising generating, using the processing circuitry (110), training data for an artificial intelligence network based on the point cloud, 3D map or other 3D representation, by generating three dimensional, 3D, images or scenes of one or more of the labelled object volumes within said point cloud, 3D map or other 3D representation from different viewpoints using at least one virtual camera.

9. The method of claim 6, further comprising generating, using the processing circuitry (110), training data for an artificial intelligence network based on the point cloud, 3D map or other 3D representation, by selecting at least part of the point cloud data, 3D map data or other 3D representation data.

10. The method of claim 1, further comprising updating, using the processing circuitry (110), a point cloud, 3D map or other 3D representation to include the labelled object volumes.

11. The method of claim 1, wherein each object label is derived based on a physical marker associated with a physical location on the real world object.

12. The method of claim 1, wherein each object label is derived based on a digital marker associated with a digital position defined in the local coordinate system.

13. The method of claim 1 wherein obtaining the set of one or more pre-labelled 3D coordinate comprises receiving one or more pre-labelled 3D coordinate each representing a point on a real world object from a user device localized within the 3D local coordinate system.

14. A system (100) for generating labelled three dimensional, 3D, data representations of real world objects, comprising processing circuitry (110) configured to:
obtain a set of one or more pre-labelled 3D coordinate, each 3D coordinate in the set of one or more pre-labelled 3D coordinate representing a point on a real world object in a real world area,
wherein each 3D coordinate in the set of one or more pre-labelled 3D coordinate is defined in a three-dimensional, 3D, local coordinate system,
wherein each 3D coordinate in the set of one or more pre-labelled 3D coordinate is associated with a respective object label representing a pre-defined object type,
wherein each object label is derived based on a marker associated with a position defined in the 3D local coordinate system and each marker is a tag to a location where the object is in the real world;
the processing circuitry (110) further being configured to, for each of the one or more pre-labelled 3D coordinates in the obtained set:
obtain a 3D template volume to be applied to the 3D coordinate;
generate a 3D object volume comprising the 3D coordinate by applying the obtained 3D template volume to the 3D coordinate; and
label the generated 3D object volume by assigning the object label of the pre-labelled 3D coordinate to all 3D coordinates located within the generated 3D object volume.

15. The system (100) of claim 14, wherein the processing circuitry (110) is configured to obtain the template volume to the 3D coordinate by obtaining a pre-determined template volume associated with the object type of the 3D coordinate.

16. The system (100) of claim 14, wherein the processing circuitry (110) is further configured to scale the template volume in relation to a determined size of the object when applying the template volume to the pre-labelled 3D coordinate.

17. The system (100) of claim 14 wherein the processing circuitry (110) is further configured to:
receive sensor data from at least one sensor located on an un-manned vehicle moving through the real world area; and
obtain the set of one or more pre-labelled 3D coordinate based on sensor data received from at least one of said sensors.

18. The system (100) of claim 14, wherein the processing circuitry (110) is further configured to generate a point cloud, 3D map or other 3D representation comprising the labelled object volumes.

19. The system (100) of claim 18, wherein the processing circuitry (110) is further configured to generate training data for an artificial intelligence network using the point cloud, 3D map or other 3D representation, by generating two dimensional, 2D images of one or more of the labelled object volumes within said point cloud, 3D map or other 3D representation from different viewpoints using at least one virtual camera.

20. The system (100) of claim 14, wherein the processing circuitry (110) is further configured to update a point cloud, 3D map or other 3D representation to include the labelled object volumes.

21. The system (100) of claim 14, wherein the processing circuitry (110) is further configured to generate training data for an artificial intelligence network based on the point cloud, 3D map or other 3D representation, by generating three dimensional, 3D, images or scenes of one or more of the labelled object volumes within said point cloud, 3D map or other 3D representation from different viewpoints using at least one virtual camera.

22. The system (100) of claim 14, wherein the processing circuitry (110) is further configured to generate training data for an artificial intelligence network based on the point cloud, 3D map or other 3D representation, by selecting at least part of the point cloud data, 3D map data or other 3D representation data.

23. The system (100) of claim 14, wherein each object label is derived based on a physical marker associated with a physical location on the real world object.

24. The system (100) of claim 14, wherein each object label is derived based on a digital marker associated with a digital position defined in the local coordinate system.

25. The system (100) of claim 14, wherein the processing circuitry (110) is further configured to obtain the set of one or more pre-labelled 3D coordinate by receiving one or more pre-labelled 3D coordinate each representing a point on a real world object from a user device (150) localized within the 3D local coordinate system.

26. A handheld user device (150, 600) for generating labelled three dimensional, 3D, data representations of real world objects, configured to be localized in a three-dimensional, 3D, local coordinate system, the handheld user device (150, 600) comprising processing circuitry (610) configured to:
> generate a set of one or more pre-labelled 3D coordinate, each 3D coordinate in the set of one or more pre-labelled 3D coordinate representing a point on a real world object in a real world area,
> wherein each 3D coordinate in the set of one or more pre-labelled 3D coordinate is defined in the three-dimensional, 3D, local coordinate system,
> wherein each 3D coordinate in the set of one or more pre-labelled 3D coordinate is associated with a respective object label representing a pre-defined object type,
> wherein each object label is derived based on a marker associated with a position defined in the 3D local coordinate system and each marker is a tag to a location where the object is in the real world;
> the processing circuitry (610) further being configured to, for each of the one or more pre-labelled 3D coordinates in the obtained set:
>> obtain or generate a 3D template volume to be applied to the 3D coordinate; and
>> generate a 3D object volume comprising the 3D coordinate by applying the obtained 3D template volume to the 3D coordinate.

27. The handheld user device (150, 600) of claim 26, wherein the processing circuitry (610) is further configured to label the generated object volume by assigning the object label of the pre-labelled 3D coordinate to all 3D coordinates located within the generated object volume.

28. A non-transitory computer-readable storage medium storing instructions which, when executed by processing circuitry (110) of a system (100) for generating labelled three dimensional, 3D, data representations of real world objects, cause the system (100) to:
> obtain a set of one or more pre-labelled 3D coordinate, each 3D coordinate in the set of one or more pre-labelled 3D coordinate representing a point on a real world object in a real world area,
> wherein each 3D coordinate in the set of one or more pre-labelled 3D coordinate is defined in a three-dimensional, 3D, local coordinate system,
> wherein each 3D coordinate in the set of one or more pre-labelled 3D coordinate is associated with a respective object label representing a pre-defined object type,
> wherein each object label is derived based on a marker associated with a position defined in the 3D local coordinate system and each marker is a tag to a location where the object is in the real world; and
> for each of the one or more pre-labelled 3D coordinates in the obtained set:
>> obtain a 3D template volume to be applied to the 3D coordinate;
>> generate a 3D object volume comprising the 3D coordinate by applying the obtained 3D template volume to the 3D coordinate; and
> label the generated 3D object volume by assigning the object label of the pre-labelled 3D coordinate to all 3D coordinates located within the generated 3D object volume.

* * * * *